July 29, 1952 J. A. FITZGIBBONS 2,604,899
PROGRESSIVE LIQUID APPARATUS
Filed May 8, 1950 2 SHEETS—SHEET 1
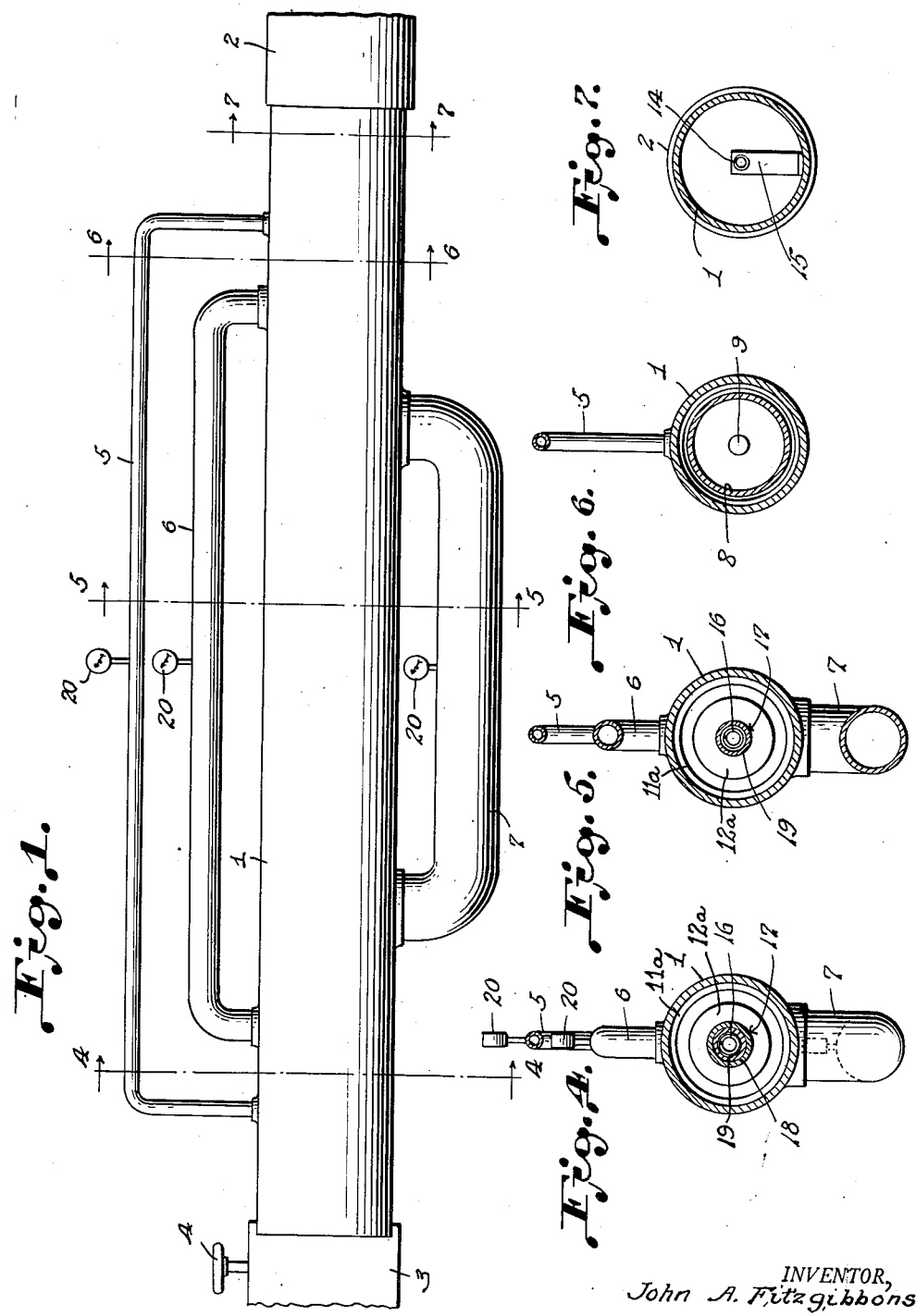
INVENTOR,
John A. Fitzgibbons.
BY
E. E. Vrooman & Co.,
ATTORNEYS.

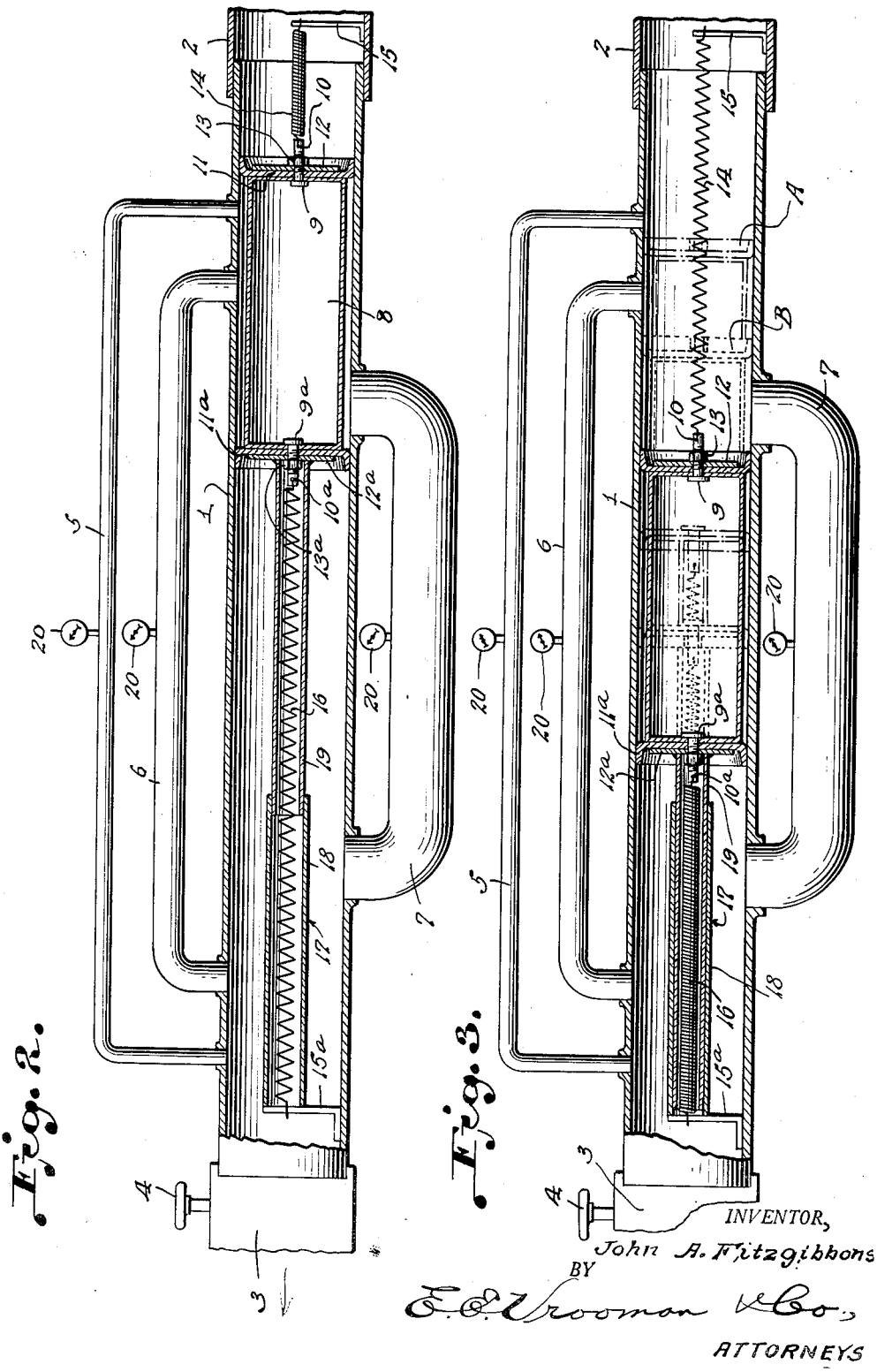

Patented July 29, 1952

2,604,899

UNITED STATES PATENT OFFICE 2,604,899

PROGRESSIVE LIQUID APPARATUS

John A. Fitzgibbons, Azusa, Calif.

Application May 8, 1950, Serial No. 160,756

2 Claims. (Cl. 137—110)

This invention relates to a progressive liquid apparatus.

An object of the invention is the construction of an efficient valve apparatus whereby the amount of liquid passing through the apparatus can be accurately determined in a very efficient manner.

Another object of the invention is the production of an efficient and comparatively simple progressive liquid metering system in which is evolved a tension and compression spring structure, for the efficient operation of the structure.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Figure 1 is a view in side elevation of a progressive liquid apparatus constructed in accordance with this invention.

Figure 2 is a view partly in elevation and partly in longitudinal sections of the apparatus, showing the hollow cylinder piston in an entirely closed position, while Figure 3 is a similar view, except the hollow cylinder piston is in a wide open position.

Figure 4 is a transverse, sectional view, taken on line 4—4, Fig. 1, and looking in the direction of the arrows.

Figure 5 is a transverse, sectional view, taken on line 5—5, Fig. 1, and looking in the direction of the arrows.

Figure 6 is a transverse, sectional view, taken on line 6—6, Fig. 1, and looking in the direction of the arrows.

Figure 7 is a transverse, sectional view, taken on line 7—7, Fig. 1, and looking in the direction of the arrows.

Referring to the drawings, in which the preferred embodiment of this invention is illustrated, I designates a pipe-like valve casing, to which is suitably secured an inlet pipe 2 and a discharge pipe 3. It is to be noted that the diameter of pipes 1, 2 and 3 is substantially the same throughout their lengths. On the discharge pipe 3 is a common valve 4 for manually regulating the flow of liquid through the pipes, as will be hereinafter explained.

A primary pipe 5 is connected to the pipe-like valve casing 1, while an intermediate pipe 6 is within the space between valve casing 1 and primary pipe 5, and this last mentioned pipe 6 is also in communication with the valve casing 1. A third pipe, known as the auxiliary pipe 7, is connected to the opposite side of the valve casing 1. The primary pipe 5 is of smaller diameter than pipes 6 and 7. Pipe 6 is of smaller diameter than pipe 7.

A hollow cylinder piston 8 is within the pipe-like valve casing 1 and has a sliding movement therein for the purpose hereinafter specified. On the right-hand end of the piston 8 is a bolt 9, which has an aperture 10. A packing cup 11 is against the end of the piston 8, with bolt 9 extending therethrough. A washer 12 is on bolt 9 against the packing cup 11. A lock nut 13 is on bolt 9 against washer 12, whereby the packing cup 11 and washer 12 are securely fastened in place upon the piston 8. A primary coil spring 14 has one end in aperture 10 and its other end is fastened to the angle bracket 15. On the opposite end, which may be known as the rear end of piston 8, is a similar bolt 9a, which has an aperture 10a. A packing cup 11a is on the bolt, as well as a washer 12a. A lock nut 13a is on the bolt, holding the washer and packing cup securely upon the rear end of the piston 8. An auxiliary coil spring 16 is fastened at its inner end in the aperture 10a and its outer end is fastened to the angle bracket 15a. A spring casing 17 surrounds the coil spring 16. The casing 17 comprises an outer primary section 18 and an inner auxiliary section 19. The outer section 18 is fixedly secured at its outer end to bracket 15a and the inner end of the auxiliary section 19 is fixedly secured to the washer on bolt 9a. The section 19 slides within the section 18. The springs 14 and 16 act to cause the piston 18 to be moved within the casing 1, with comparative ease, when valve 4 is operated.

On pipes 5, 6 and 7 are gauges 20 to indicate the amount of liquid flowing through the pipes.

In operation, when the valve 4 is slightly open the piston 8 will move to the dotted position A, whereupon the liquid passes through the small primary pipe 5, the flow being indicated on its meter or gauge 20. When the valve is more greatly opened, the piston takes the dotted position B, whereupon the liquid is passing not only through the primary pipe 5 but also the intermediate pipe 6. When the piston 8 is in its full open position, as shown in Fig. 3, by reason of valve 4 being fully opened, the liquid is passing through all three of the pipes 5, 6 and 7, with the gauges or meters 20 indicating the amount of flow.

It is to be noted that the pipes 5, 6 and 7 have their inlet ends at the right of the drawing, Fig.

3, while their discharge ends are at the left of the drawing.

The primary spring 14 may be called the tension spring, while the auxiliary spring 16 may be called the compression spring. As indicated hereinbefore, the tension of these springs is so balanced that the piston 8 acts with great efficiency. The entire apparatus is therefore a complete automatic progressive and reducing valve system.

While I have described the embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a device of the kind described, a cylindrical valve casing having oppositely disposed lateral ports closely spaced longitudinally of the casing, said ports being arranged to form a group at one end of the casing and a group at the other end of the casing, pipes connecting the ports of one group with corresponding ports of the other group, a cylindrical valve having a body within the casing and spaced from the wall thereof, said body being provided with piston-like ends fitting within the casing, said valve being moveable longitudinally of the casing and positioned to close the openings of one of said groups at one limit of its movement and to lie intermediate of said groups at the other limit of its movement, tension springs connected to said valve at the opposite ends thereof, and brackets projecting inwardly of the casing and forming means for attaching said springs.

2. In a device of the kind described, a cylindrical valve casing having oppositely disposed lateral ports closely spaced longitudinally of the casing, said casing provided with brackets projecting inwardly, said ports being arranged to form a group at one end of the casing and a group at the other end of the casing, pipes connecting the ports of one group with corresponding ports of the other group, a cylindrical valve having a body within the casing and spaced from the wall thereof, said body being provided with piston-like ends fitting within the casing, said valve being moveable longitudinally of the casing and positioned to close the openings of one of said groups at one limit of its movement and to lie intermediate of said groups at the other limit of its movement, tension springs connected to said valve at the opposite ends thereof, and a telescopic tubular device surrounding one of said springs and connected to the valve at one end and to one of said brackets at the other end.

JOHN A. FITZGIBBONS.

REFERENCES CITED

The following references are of record in the file of this patent:

UNITED STATES PATENTS

| Number | Name | Date |
|---|---|---|
| 1,924,468 | Stone | Aug. 29, 1933 |
| 2,003,474 | Schweiter | June 4, 1935 |

FOREIGN PATENTS

| Number | Country | Date |
|---|---|---|
| 2,597 | Great Britain | of 1913 |